United States Patent [19]

Gerontopoulos et al.

[11] Patent Number: 4,571,315
[45] Date of Patent: Feb. 18, 1986

[54] PREPARING CERAMIC MATERIAL PELLETS

[75] Inventors: Panaiotis Gerontopoulos, Leghorn; Guido Cogliati, Rome, both of Italy; Karl Richter, Karlsruhe, Fed. Rep. of Germany

[73] Assignees: AGIP Nucleare S.p.A.; CNEN-Comitato Nazionale per l'Energia Nucleare, both of Rome, Italy

[21] Appl. No.: 577,828

[22] Filed: Feb. 7, 1984

Related U.S. Application Data

[63] Continuation of Ser. No. 438,745, Nov. 3, 1982, abandoned, which is a continuation of Ser. No. 133,598, Mar. 24, 1980, abandoned, which is a continuation of Ser. No. 033,319, Apr. 25, 1979, abandoned.

[30] Foreign Application Priority Data

May 5, 1978 [IT] Italy ............................... 23059 A/78

[51] Int. Cl.$^4$ ............................................. C04B 35/34
[52] U.S. Cl. ....................................... 264/0.5; 264/65; 264/66
[58] Field of Search ................... 438/745; 264/0.5, 65, 264/66

[56] References Cited

U.S. PATENT DOCUMENTS 3,345,437 10/1967 Flack .
3,355,393 11/1967 Swanson .

FOREIGN PATENT DOCUMENTS 811641 4/1969 Canada .

OTHER PUBLICATIONS

Wheat, "Techniques for Producing Reactive and Homogenous Ceramic Powders", *J. Con. Cer. Sol.*, vol. 46, 1977, pp. 11–18.

*Primary Examiner*—John A. Parrish
*Attorney, Agent, or Firm*—Morgan, Finnegan, Pine, Foley & Lee

[57] ABSTRACT

Ceramic pellets, which may have, or not, nuclear fuel materials embedded therein, are formed by first preparing a gel by precipitation of metallic salts from solutions of their compounds at a concentration of at least 10 grams per liter, said solutions being added dropwise to a coagulation bath which contains, for example, ammonium or sodium hydroxide, whereafter the precipitated gel are fired, in one or two stages, to precondition them prior to the compaction to form the final pellets which are subsequently sintered at an appropriate temperature.

22 Claims, No Drawings

CROSS REFERENCE TO RELATED APPLICATIONS

This application is a continuation of application Ser. No. 438,745, filed Nov. 3, 1982 now abandoned which in turn is a continuation of application Ser. No. 133,598, filed Nov. 24, 1980 (now abandoned), which in turn is a continuation of application Ser. No. 033,319 filed Apr. 25, 1979 (now abandoned).

It is known that the most widespread method for the preparation of pellets of ceramic nuclear fuel, for example of uranium oxide, mixed oxides of uranium and plutonium, mixed oxides of thorium and uranium and others consists in compacting by cold pressing, in appropriate cylindrical molds, fine powders of the materials concerned and in the subsequent densification of the thusly obtained bodies having a comparatively low density and mechanical compactness, which are called in the technical parlance the "green preforms", by sintering them at a high temperature. The density of the end product may vary from 75% to 98% of the theoretical density of the material concerned, calculated on the basis of its crystallographical parameters.

The starting powders used in the process outlined above, which are called in the technical language the "ceramic grade powders", are generally obtained by thermal decomposition of intermediate compounds of various grade which are obtained, in turn, from the conversion of aqueous solutions containing the heavy metals concerned and coming from the ore-refining installations, isotope enrichment installations, exhausted fuel reprocessing plants and the like.

Thus, ceramic grade powders of uranium oxide, plutonium oxide, thorium oxide and others, are obtained, respectively, for example, by thermal decomposition of finely divided precipitates of ammonium biuranate, plutonium oxalate, thorium hydroxide, plutonium hydroxide and others. Said ceramic grade powders are characterized in that they are composed by very tiny particles, typically of the order of magnitude of one micron, and in that they have comparatively high specific surface areas, typically of from 1 to 10 square meters per gram. Such properties are achieved not only by means of an appropriate control of the working conditions in the conversion process and the thermal decomposition step of the intermediate compounds, but also by additional conditioning operations on the same powders, such as by milling in ball mills.

Quite similarly, ceramic grade powders composed by admixtures of oxides of uranium, plutonium, thorium and others are generally obtained by mechanically blending the ceramic grade oxides concerned as prepared according to the procedures recalled above, or also by thermal decomposition of intermediate products which have been obtained by co-precipitation of the metals concerned from their aqueous solutions.

Prior to being employed in the process first described hereinabove, the ceramic grade powder must be subjected to preconditioning operations of various kinds in order to improve their fluidity in the transfer conduits upstream of the pressing mold, a homogeneous compaction in pressing must be obtained and the densification of the green preforms must be improved. It is known, for example, a treatment of granulation, according to which the ceramic grade powder is admixed with small quantities of organic substances such as polyethylene glycol and/or the polyvinyl alcohol, and water, until the admixture has attained a doughy consistency. Such a dough, upon drying, is split into agglomerations of a few hundreds of microns by extrusion through screens having meshes of an appropriate size. The powder which is thus obtained is fed to the press for shaping the pellets. As an alternative, the ceramic grade powder, supplemented by appropriate organic substances, is preliminarily compressed into large size molds and the thusly obtained blocks are broken and converted into agglomerates of a few hundred microns and similarly used for feeding a press.

The requirement of working with very fine powders which characterizes the method outlined above for shaping the pellets involves, in addition to the plurality of intermediate working stages between the conversion of the metal solutions into the respective ceramic grade powders and the pellets shaping step, difficulties of other kinds. As a matter of fact, the high dispersibility of the powders originates, especially in the case of the preparation of plutonium-containing nuclear fuels, safe-shipping problems, the necessity of counting the fissile material deposited on the apparatus walls by dispersion and the hazard of the high dosages of penetrating radiations to which the personnel employed in the manufacture of the fuel is exposed on account of the multiplication of the irradiating surfaces.

According to the method of the present invention, it becomes possible to offset the above mentioned shortcomings by dispensing with the use of fine powders along the entire processing cycle, and also by using, in the pellet preparation stage, as the material to be fed to the press, spheroidal particles prepared according to the teachings of the Italian Patent Specification No. 727 301, that is, starting from solutions of fissile and/or fertile metals modified by the addition of a polymer having a comparatively high intrinsic viscosity, which will be called hereinafter a "gelling agent", which is preferably hydroxypropylmethylcellulose, and possibly an alcohol, preferably tetrahydrofurfuryl alcohol, dripping or spraying said solutions into a precipitation bath such as an ammonium hydroxide bath, drying the gelled particles so obtained and then firing them according to the procedure outlined in the present specification. The invention permits that, for example, mixed pellets of uranium and plutonium oxides may be prepared without resorting, for example, to the precipitation in oxalate form and also the use of extremely diluted starting materials, that which has not been considered in the art heretofore.

Obviously, the reference to the method of preparation according to the Italian Patent aforementioned and in particular the reference to the gelling agents and the modifying alcohols specified therein, are not limitations of the present invention. As a matter of fact, other kinds of organic polymers or gelling agents and alcohols having the properties of modifying the viscosity and the surface tension of the solutions of the heavy metals concerned, so as to promote the conversion of the liquid droplets into coherent gel particles by contacting the precipitation bath, can also be used. Other examples of gelling agents are polyvinyl alcohol and also other organic compounds belonging to the same class are Arabic gum, siccoline, polyacrylamide and others.

The calcination (firing) of the dried gel particles is carried out according to what is reported by way of example in the present patent application, under conditions of temperature, nature of atmosphere and others which are such as to produce particles of the oxides of the metals concerned having optimum properties as regards, for example, the specific surface area, the chemical composition, the density and others, for their subsequent exploitation as the starting products of the process for manufacturing the pellets claimed herein.

Generally speaking and by way of example, it is possible to work starting from 400° C. to temperatures near to 1000° C., with a processing time of, for instance, one hour. Temperatures in the vicinity of 1000° C. appear to be the best even if to be afforded such an opportunity for operation is surprising inasmuch as at 1000° C. one is near to the sintering temperatures. Consistently with the selected values for the temperature and the time adopted for firing and the possible use of lubricants, it is possible to attain the desired value for the final density.

The first particles, having diameters which may range within any desired limits but preferably between 50 and 1000 microns, can directly be used for feeding the pellet-forming press without any additional treatments such as milling or homogenization with binders. Press feeding and compaction by cold pressing are facilitated considerably by the spheroidal shape of the particles, so that also their lubrication, for example by zinc stearate, can be dispensed with, since it is enough to lubricate the press piston.

It is possible, sometimes even advisable, to resort to the small addition of, for example, conventional lubricants, inasmuch as additions of this kind permit that the density of the produced particles may be varied within a very wide range, it being also possible to control the kind of porosity as such, e.g. the distribution of the pores and like properties. Another factor influencing porosity is the selection, once the quantity of the lubricant has been selected, of the particle size of the spheroids to be adopted.

The method for manufacturing pellets of the claimed ceramic materials, to be described in more detail in the examples of the present patent application, is not restricted, as it is obvious, to the preparation of ceramic nuclear fuel based on oxides. As a matter of fact, the preparation of pellets of other ceramic materials such as, for example, carbides, nitrides, carbonitrides of the fissile and/or fertile metals is equally practicable by adding to the starting solution finely divided carbon such as carbon black and heating the carbon-containing gelled particles in an appropriate atmosphere or under vacuum so as to convert, by the known carboreduction process, the particles into particles of carbide, nitride, carbonitride and the like having the expected chemical composition and physical properties. These particles are subsequently cold-pressed into pellets and sintered at a high temperature.

Lastly, the claimed process is not limited to the preparation of cylindrical pellets of ceramic nuclear materials, but it can find a useful application in the preparation of bodies or articles having a different geometry with materials composed, for example, by oxides of iron, zirconium, nickel, chromium, silicon, titanium, aluminum, either alone or in different admixtures.

The following examples which are nonlimiting show the preparation of pellets are are intended to describe in more detail the method claimed herein in a few typical cases of application.

EXAMPLE 1

An aqueous solution containing 0.084 mol per liter of $Pu(NO_3)_4$, 0.336 mol per liter of $UO_2(NO_3)_2$, 0.5 mol per liter of $HNO_3$, 20% by volume of tetrahydrofurfuryl alcohol, and 6 grams per liter of Methocel (a cellulose ester produced by Dow Chemical Co.) is added dropwise, through a small tube having an outside diameter of 1.2 mm and an inside diameter of 0.8 mm, to a precipitation bath consisting of a 12M aqueous solution of $NH_4OH$. The as-formed gel particles, which contain a precipitate of ammonium biuranate and plutonium hydroxides, are washed in water and dried under vacuum at 80° C. The spheroidal particles thus obtained have a diameter of about 0.5 mm. After appropriate heat treatments to be exemplified hereinafter, they form a material which is adapted to feed the shaping press for the pellets of $(Pu,U)O_2$.

EXAMPLE 2

An aqueous solution containing 0.40 mol per liter of $UO_2F_2$, 35% of volume of tetrahydrofurfuryl alcohol and 9 grams per liter of Methocel K4M is added dropwise to ammonium hydroxide as in Example 1 and converted into particles of gel containing ammonium biuranate and having a diameter of 600 microns. The particles are fired and converted into $UO_2$ pellets according to the procedures illustrated in the following Examples.

EXAMPLE 3

An aqueous solution containing 0.3880 mol per liter of $Th(NO_3)_4$, 0.0380 mol per liter of $UO_2(NO_3)_2$, 1.5 mol per liter of free $HNO_3$, 0.9 grams per liter of Methocel K4M, 30% by volume of tetrahydrofurfuryl alcohol is converted into gel particles as in the previous Examples and supplies a material for the preparation of pellets of $(Th,U)O_2$.

EXAMPLE 4

An aqueous solution containing 0.025 mol per liter of $Pu(NO_3)_4$, 0.8 mol per liter of free $HNO_3$, 3 grams per liter of Methocel J75M is sprayed through a nozzle having a high rate of flow. The solution droplets are collected in a vessel containing an aqueous solution of 12 M ammonium hydroxide. The thus obtained gel particles are dried in a gas stream in a semifluid bed apparatus and then fired in air at 600° C. The particles of $PuO_2$ having a diameter of less than 5 microns are mechanically admixed with ceramic grade $UO_2$ powder produced with any conventional procedure and such mixture is used for the preparation of pellets obtained by cold pressing and sintering according to the usual technologies.

EXAMPLE 5

Examples from 1 to 4 are repeated but replacing Methocel by a double amount of a polyvinyl alcohol having a mol wt 90,000, for example the one produced by Serva Feinbichemica and marketed under the name of 48/20 polyvinyl alcohol.

EXAMPLE 6

A nitric solution having a concentration of 0.042 M of Pu (20% of which in the hexavalent state and the balance in the tetravalent state) and of 0.12 M of U, 0.5 mol per liter of free $HNO_3$, 20% by volume of tetrahydrofurfuryl alcohol and 3 grams per liter of Methocel K4M is converted into gel particles as shown in Example 1 and equivalent results are obtained, with the exception of the spherical contour of the particles, which, in this case, have an oval shape.

EXAMPLE 7

Example 1 is repeated by dispersing in the starting solution, by means of an ultrasonic homogenizer, the carbon black marketed by CABOT ITALIANA S.p.A. under the Trade Mark Monarch 1100. This carbon black is added to the solution in such an amount as to obtain an atomic ratio of C to (U+Pu) equal to 3.17. The spheroidal particles are dried and fired in argon up to a temperature of 900° C. and then converted into particles of a mixed uranium-plutonium carbide for transferring it under vacuum up to a temperature above 1300° C. The carbide particles are then admixed with 0.15% by wt of zinc stearate, cold pressed in a cylindrical due of the diameter of 6 mm under a pressure of 4 tonnes per square centimeter. The green preforms thus prepared are then sintered by treating them for two hours in an atmosphere of argon at a temperature of 1550° C., to obtain pellets of a mixed monocarbide of uranium and plutonium having a density of over 94% of the theoretical density for such a material.

EXAMPLE 8

An aqueous solution containing 1.2 mol per liter of iron nitrate, and 0.4 mol per liter of nickel nitrate and 3 grams per liter of Methocel K4M is added dropwise to a solution of sodium hydroxide. The gel particles thus obtained are washed in water, dried, fired in air at 600° C. and converted into cubic pellets having a side of 3 mm and a density of 5 grams per cubic centimeter by cold pressing, with no lubricants added, under 4 tonnes per square centimeter and sintered in inert atmosphere for two hours at the temperature of 1200° C.

EXAMPLE 9

The gel particles containing plutonium oxide and prepared according to Example 6 are heated under vacuum at the temperature of 900° C. and fired at the same temperature during one hour in air in an atmosphere formed by 94% by volume of Ar and 6% by volume of $H_2$.

The plutonium oxide particles so prepared, having a specific surface area of 15 square meters per gram, are admixed with the 1% by wt of zinc stearate and converted into green preforms having a diameter of 6.8 mm and a height of 9 mm by cold pressing under 5 tonnes per square centimeter by means of a hydraulic press. "Green preforms" having a fair mechanical consistency are obtained and a density of 5.8 grams per cubic centimeter. Such greens are placed in an oven and heated at the velocity of 200° C. an hour up to 1200° C. and maintained at the latter temperature for 2 hours.

Sintered pellets of plutonium oxide are obtained with a density over 10.40 grams per cubic centimeter.

EXAMPLE 10

The gel particles prepared according to Example 1 are treated according to the procedure of Example 9. There are obtained in this way sintered pellets of mixed uranium-plutonium oxide having similar properties.

EXAMPLE 11

Gel particles containing plutonium hydroxide and prepared according to Example 6 are heated under vacuum up to a temperature of 500° C. and fired in air at this temperature for one hour. The thusly obtained $PuO_2$ particles which have a specific surface area of 30 square meters per gram are admixed with the 1% by wt of zinc stearate and converted into "greens" having a diameter of 6.8 mm and a height of 9 mm by cold pressing under 3 tonnes per square centimeter by means of a hydraulic press, Greens are obtained which have a fair mechanical consistency and a density of 4 grams per cubic centimeter.

Such greens are placed in an oven and heated at a heating velocity of 330° C. an hour up to 1700° C. and maintained at the latter temperature for 4 hours. There are obtained sintered pellets of plutonium oxide with a density of 9 grams per cubic centimeter.

EXAMPLE 12

Gel particles containing ammonium biuranate and prepared according to Example 2 are heated in an atmosphere composed by 94% by volume of Ar and 6% by volume of $H_2$ up to 1000° C. and maintained at the latter temperature for 2 hours, whereafter they are admixed with zinc stearate in the proportion of 1% by wt of the latter and converted into "greens" having a diameter of 12 mm and a height of 14 mm by cold pressing in a cylindrical die under 5 tonnes per square centimeter. The greens thus obtained are sintered in an atmosphere of Ar with 6% $H_2$ at 1200° C. during 4 hours and $UO_2$ pellets are obtained which have a density over 10.50 grams per cubic centimeter.

EXAMPLE 13

Gel particles obtained in the manner described in Example 3 are fired for two hours in air at the temperature of 600° C. and additionally fired in an atmosphere of Ar with 6% $H_2$ at the temperature of 1050° C.

The particles of $(Th,U)O_2+C$ prepared in this way are admixed with 0.2% by wt of zinc stearate and used for preparing greens having a diameter of 15 mm and a height of 20 mm by cold pressing in a cylindrical die and by applying a pressure of 3 tonnes per square centimeter. Such "greens" are placed in an oven and heated in an atmosphere of argon at the velocity of 100° C. an hour up to 1300° C. and maintained at the latter temperature during 2 hours. There are obtained pellets of $(Th,U)C_2$ pellets which have a density over 9.40 grams per cubic centimeter.

We claim:
1. In a method for preparing pellets of a ceramic material selected from the oxides of iron, zirconium, titanium, nickel, chromium silicon, aluminum, rare earths and mixtures thereof, and comprising the steps of:
   (a) converting an aqueous solution containing said material in the form of its metal salt and a gelling agent into gel particles by adding solution to a precipitation medium;
   (b) thermally conditioning said particles; and
   (c) cold pelletizing and sintering said thermally conditioned particles at a temperature of from about 1100° C. to about 1750° C.;
   the improvement which comprises thermally conditioning said particles in a controlled atmosphere of air at a temperature between 400° C. to 600° C.
2. The method of claim 1 wherein prior to said thermal conditioning step, the particles are subjected to a pre-calcination step under vacuum at a temperature between 500° and 1000° C.
3. The method of claim 1 wherein subsequent to said thermal conditioning step, the particles are subjected to a reducing atmosphere at a temperature from 700° to 1050° C.

4. The method of claim 3 wherein said temperature is 1025° C.

5. The method of claim 3 wherein said reducing atmosphere is comprised of argon and hydrogen gases.

6. The method of claim 1 wherein said gel particles are spheroidally shaped.

7. The method of claim 1 wherein said solution contains a gelling agent selected from hydroxypropylmethylcellulose, arabic gum, polyacrylamide, siccoline or polyvinylalcohol and said conversion is effected by dropping said solution into an ammonium or alkali metal hydroxide solution.

8. The method of claim 1 wherein said ceramic nuclear material is selected from uranium, plutonium, thorium or mixtures thereof.

9. The method of claim 1 wherein said solution contains a total metal concentration of from 10 to 100 g/l.

10. The method of claim 1 wherein said solution contains a carbonaceous substance and said thermal conditioning step is effected at a temperature between 1300° C. and 1500° C.

11. The method of claim 1 wherein said cold pelletizing step results in spheroidal particles having a size of from 20° to 100° microns.

12. The method of claim 1 wherein prior to said pelletizing step, a lubricant is added to the particles.

13. The method of claim 7 wherein said dropping step is effected by dripping said solution into said hydroxide solution.

14. The method of claim 7 wherein said dropping step is effected by spraying said solution into said hydroxide solution.

15. The method of claim 7 wherein an alcohol is included in said ceramic material metal salt solution.

16. The method of claim 15 wherein said alcohol is tetrahydrofurfuryl alcohol.

17. The method of claim 1 for the production of pellets of mixed uranium and plutonium oxide wherein said ceramic material metal salt solution contains plutonium nitrate and uranyl nitrate, the concentration of total metal being at least 10 g/l.

18. The method of claim 8 wherein said ceramic material metal salt solution contains uranyl fluoride, the metal concentration being at least 10 g/l.

19. The method of claim 8 wherein said ceramic material metal salt solution contains thorium nitrate and uranium nitrate, the concentration of total metal being at least 10 g/l.

20. The method of claim 7 wherein said gelling agent is present in concentrations of from about 2 to about 5 g/l and has a viscosity below 10 cps at 20° C.

21. The method of claim 20 wherein said particle size is from 50 to 250 microns.

22. The method of claim 12 wherein said lubricant is zinc stearate, employed from 0.05% to 1.5% by weight.

* * * * *